Patented June 11, 1935

2,004,673

UNITED STATES PATENT OFFICE 2,004,673

MANUFACTURE OF A NUTRIENT MEDIUM

Ernst Pieper, Berlin-Tempelhof, and Walter Wolffenstein, Berlin, Germany, assignors to Schering-Kahlbaum A. G., Berlin, Germany No Drawing. Application April 12, 1932, Serial No. 604,866. In Germany May 26, 1931

1 Claim. (Cl. 167—78)

Our invention refers to the manufacture of nutrient media for bacteria and the like and may be used for the cultivation of bacteria and for the recovery of toxins. The nutrient medium of our invention has been favorably reported in the scientific literature for use in the cultivation of gonococci.

As is well known to those skilled in the art, human placentæ have been subjected to treatment whereby they are converted into nutrient media for the cultivation of bacteria, these media however have limitations.

We have found that a very valuable nutrient medium particularly adapted for use in the cultivation of gonococci is obtained by extracting placentæ by plain water, that is water substantially free from dissolved salines, provided the proportions are so chosen that from about 1.5 parts of placentæ about 1 part of the watery extract is obtained.

We can obtain this either by boiling 3 placentæ at a time in about 1 litre water, taking care to maintain this proportion when employing larger placentæ or by boiling one placenta in about 1 litre water, withdrawing the placenta, replacing the lost water, boiling another placenta in the gravy thus obtained, withdrawing this second placenta and boiling in the gravy a third placenta which is then removed, the gravy being now concentrated, preferably in vacuo, as above described. This latter method has been found to be the most favorable one.

To the gravy thus obtained can be added ordinary salt and the like as usual, however only 0.1% salt, instead of 0.5% being required. Preferably the liquor is brought to a hydrogen ion concentration pH=7.2–7.4. Obviously all suitable kinds of additions used for bacteriological purposes, including whey, carbohydrates etc. can be made making the medium suitable for growing various bacteria.

In the nutrient medium thus prepared bacteria will grow under the form of a thick, streaky, stringy mass without rendering it turbid and will deliver ample quantities of toxins to the medium, which can be determined by injection and by complementary binding with the sera of persons infected.

In practising our invention we may for instance proceed as follows:—

Example

A normal placenta weighing about 500 grams is comminuted as usual and macerated over night in one litre water in a refrigerator, whereupon it is boiled under the reflux condenser during about 20 minutes under careful stirring, being thereafter percolated under pressure. The extract is now filled up with water to the volume of 1 litre and a fresh comminuted placenta is boiled therein in the same manner under the reflux condenser. After percolation the filtrate is once more filled up to 1 litre and a third fresh placenta is boiled therein under continuous stirring under the reflux condenser during 20 minutes and thereafter filtered. To the extract thus obtained 1% peptone Witte and 0.1% salt (sodium chloride) are added. The liquor is now kept in Koch's digester for about 15 minutes, is then brought to 7.2 pH with normal soda solution, is treated once more in the digester during 15 minutes, thereupon subjected to repeated hot filtration through paper filters until the filtrate is limpid, whereupon it is introduced in the heat into sterilized glass vessels, to be once more sterilized therein.

Various changes may be made in the details disclosed in the foregoing specification without departing from the invention or sacrificing the advantages thereof.

In the claim affixed to this specification no selection of any particular modification of the invention is intended to the exclusion of other modifications thereof and the right to subsequently make claim to any modification not covered by the claim is expressly reserved.

We claim:—

A nutrient medium suitable for use in the cultivation of gonococci which consists substantially of an aqueous extract of placenæ in plain water containing at least about 1.5 parts placenta to 1 part of aqueous extract, having a pH of about 7.2 to 7.4, and which may contain the usual additions used for bacteriological purposes.

ERNST PIEPER.
WALTER WOLFFENSTEIN.